Exam

Jan. 16, 1923. Re. 15,529

R. H. DICK ET AL.
HEAT RESISTING CABINET AND METHOD OF MAKING THE SAME.
ORIGINAL FILED JUNE 1, 1920. 2 SHEETS-SHEET 1

INVENTORS
Ralph H. Dick
Carl F. Wolters
BY Stewart & Berry
Their ATTORNEYS

Jan. 16, 1923.

Re. 15,529

R. H. DICK ET AL.
HEAT RESISTING CABINET AND METHOD OF MAKING THE SAME.
ORIGINAL FILED JUNE 1, 1920.

2 SHEETS-SHEET 2

INVENTORS
Ralph H. Dick
Carl F. Wolters
Stewart & Perry
their ATTORNEYS

Reissued Jan. 16, 1923. Re. 15,529

UNITED STATES PATENT OFFICE.

RALPH H. DICK AND CARL F. WOLTERS, OF MARIETTA, OHIO, ASSIGNORS TO THE SAFE-CABINET COMPANY, OF MARIETTA, OHIO, A CORPORATION OF OHIO.

HEAT-RESISTING CABINET AND METHOD OF MAKING THE SAME.

Original No. 1,342,204, dated June 1, 1920, Serial No. 219,526, filed February 27, 1918. Application for reissue filed February 3, 1922. Serial No. 533,927.

*To all whom it may concern:*

Be it known that we, RALPH H. DICK and CARL F. WOLTERS, both citizens of the United States, and residents of Marietta, Washington County, Ohio, have invented a new and useful Improvement in Heat-Resisting Cabinets and Methods of Making Same, of which the following is a specification.

Our invention relates to cabinets or light weight safes intended for use as containers for valuable papers, documents, records or other articles, and our object has been to devise a construction which would combine with absence of great weight, elements to resist the entrance of heat to the interior, a strength and rigidity of construction which will prevent buckling under high temperatures or injury to the cabinet in the event of a fall or rough handling of any kind, together with marked simplicity and economy in the methods of construction employed.

Our invention also relates to the method or process of making said linings, objects of which are as follows: to produce light-weight safe linings by a novel, economical and effective method; to produce, by a new and economical method, a composite, hollow, heat-resisting structure which is adapted for use as a safe and as the lining of metal safes and which is light, strong and durable; to provide a method by which the free water is eliminated from the aforesaid structure, leaving only the chemically bound water which is efficaciously utilized in the presence of high temperature to which the safe may be subjected in case of fire; to provide a method of making safe linings by which the latter are produced independently of the safe structure or walls and embodied in the safe during the process of making the latter; and to include in the method of making the lining or casting a step involving the reinforcement of the latter so that it is held as an integral unit.

In the many known forms of heavy iron safes disclosed in the art, there are examples in which, between a thick outer wall and a lighter inner wall, a plastic mass of material containing enough water or other liquid to permit of a free flow, has been poured for the purpose of providing an element to delay the entrance of heat to the interior of the safe, and also to permit of the production of vapor or steam under high temperatures to moisten the contents and prevent their destruction by the heat. To this construction there are several objections. The heavy iron walls necessarily are of excessive weight which is always an objection for many reasons, and in addition are excellent conductors of heat.

The free water in the plastic filler poured into the space between the heavy outer and lighter inner walls is not bound or permanently fixed in the mass and therefore is certain to cause corrosion of the walls. It also dries out with age leaving cracks in the filler. It is obvious that, when excessive heat reaches a heavy iron wall in proximity to such a crack, the heat will very quickly reach the interior of the safe. It is also impossible to be certain at any time as to the percentage of water in such a filler. To make such a mass pourable there is an excess of water required beyond that required to make it a good heat insulator, but the conditions as to temperature and atmospheric moisture in the place where such a safe is located have a definite effect on the filling which cannot be ascertained without tearing down the safe.

As is well known in the trade and to the public, this excess of moisture is also a menace when such a safe is new, for the reason that if the doors are kept closed for any length of time, "sweating"—as it is termed—will occur and the moisture will then pass to the interior of the safe causing the contents to become mildewed or otherwise damaged.

In actual practice it has been very laborious and expensive to construct these double walled cabinets with the heat insulating materials between the walls, because of the absolute necessity for the greatest care to avoid any crack or opening of any kind in the insulation through which heat could pass to the interior. Of necessity some of these insulating materials are more or less brittle and therefore edges or corners are liable to be chipped off in handling or fitting the insulation or in shaping it to fill in the corners and bends of the sheet metal walls. There is frequently much time and labor involved also in beveling, shaping and fitting the said insulation. It is obvious that a weak spot will exist whenever any kind of an opening or break occurs in the insulating material.

In our invention herewith, these objections are overcome, as the heat insulation extends practically from the point where the excessive heat is located to the interior of the cabinet, and in addition contains only a predetermined amount of chemically bound water which remains bound until it is needed, when it is released by the high temperature.

Our present invention is superior to the double walled sheet metal cabinets in which heat insulating materials are placed between the said walls, in that our heat insulation is one integral member with no joints, seams or openings of any kind, cast in a mold to fit perfectly, its outer shell of sheet metal, and pre-dried at a fixed temperature, so that the exact amount of moisture best calculated to provide heat insulation remains chemically bound in the said casting.

Another advantage arising out of forming the heat insulating lining outside of the casing walls, lies in the fact that, after the molded lining is removed from the mold, it can be inspected, and, if there are any air holes or defects of any kind, caused by lumps in the mixture or the presence of any undissolved substances, they may be remedied before the lining is positioned in the casing.

A greater structural strength and rigidity of construction is also found in this invention because of the reinforcement we provide in the cast insulation of our structure, as well as the thickening of the corners.

In the drawings herewith:

Figure 1:
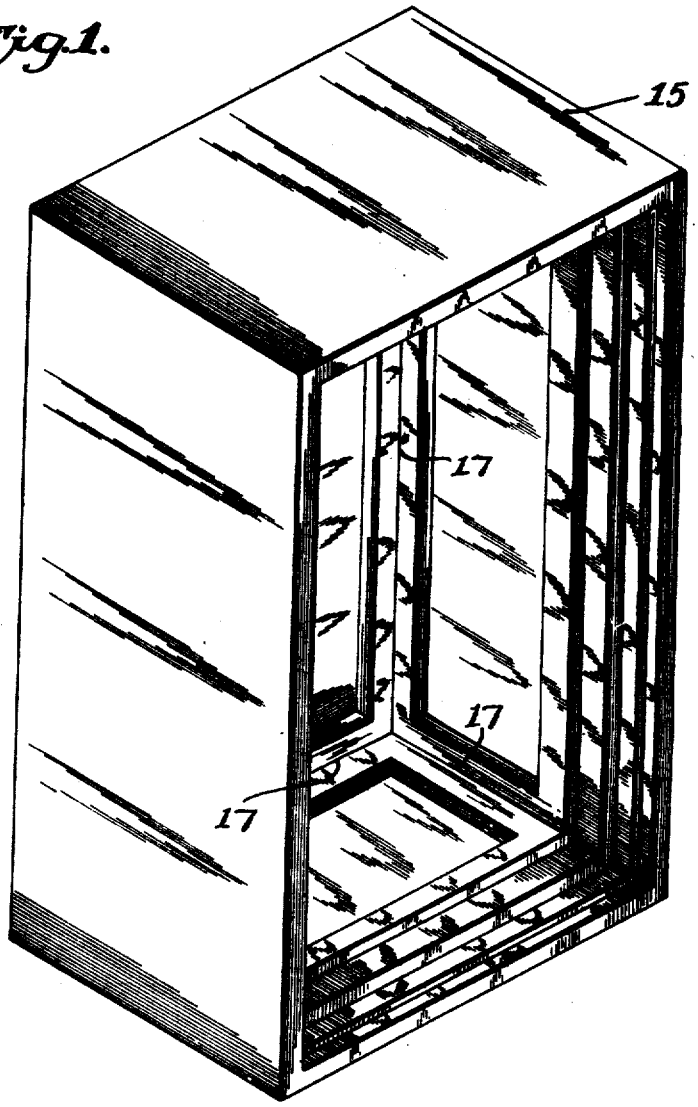
Figure 1 is a perspective view of the molded heat insulation lining of the structure.

In the drawings, the structure is shown to include sheet metal outer walls, 10 being the front wall, 11—11 being the side walls, 12 the back wall, 13 the top wall and 14 the bottom wall. These may be made in the usual manner and in any desired form or size and preferably are constructed to form the top, bottom, front and side walls, with the back wall omitted to permit of the positioning of the cast insulation 15, after which the back wall may be placed in position and secured in any desired way, such as welded for instance. As is obvious, the front wall could be omitted for this purpose and the cast insulation could be positioned through the opening.

The heat insulating lining 15 may be made of any material which can be mixed with water so that it can be molded to the desired form. Among other substances, we have found practical a mixture of gypsum and a small proportion of saw-dust or other suitable material to give a needed elasticity and decrease the frangibility of the structure.

This mixture is poured into a mold constructed to follow precisely the form of the inner sides of the outer steel walls. When it has set, the molded insulation lining is removed from the mold. On account of the quantity of water used to make a mixture which could be poured into the mold, this cast lining now contains a superfluous amount of free moisture which, if it were allowed to remain, might cause corrosion of the metal outside walls, and in addition an unnecessary weight is caused thereby. The cast, therefore, is placed in a drying room in which a fixed temperature is maintained, and with the aid of a blower apparatus the free water is abstracted and only the chemically bound water is retained. This is sufficient when the completed cabinet is subjected to high temperature, to escape in the form of a vapor or steam into the interior of the cabinet where it will moisten the contents and aid in preserving them.

To reinforce the cast lining and give it a strength that will prevent its breaking down under great heat, we insert in the mold, before the mixture is poured, a sheet of mesh wire 16 which serves to hold the casting together at all times. In our tests and experiments we have found that, even when a very high temperature has calcined the material to almost a friable point, this reinforcement holds the casting in an integral unit.

In the corners of the cabinet and along the edges of the corners, where the greatest amount of heat is apt to make its way to the interior, we form in the casting an increased thickness of the material as indicated at 17.

After the casting has been dried to the predetermined point, the sheet metal casing is slipped on over the casting, the wall omitted to permit of the positioning, is secured in place and the front door or doors are swung on the hinges.

If desired, inner walls or linings may be put in but this is optional as the casting itself has a fine finish and could be painted or stained and grooved to receive shelves or other interior fittings. In like manner the outer casing of metal may be omitted and the composite structure may be used as a safe without either inner or outer metal casings, in which case the hinges to support the doors are embedded in the casting in a way well understood in the art. It is our purpose also to form the doors of cast material in a manner similar to that stated with reference to the drying out of the body casting, so that the whole structure will embody the same characteristics as described, including a composite body from which the free moisture has been eliminated. Where an external metallic casing is employed, the hinges supporting the doors may be carried by said casing if desired.

In the foregoing description, in addition to setting up structural characteristics of the safe or cabinet and its composite lining, we have set forth a method of making light-weight safes or linings for safes or cabinets which will be more clearly understood when briefly stated, as follows:

(1) Gypsum and a small proportion of saw-dust are mixed together and with a sufficient quantity of water to render the same limpid or capable of being poured into the mold. Suitable material, other than saw-dust can be used, the essential being to give a needed elasticity and decrease the frangibility of the composite structure.

(2) A mold is constructed to follow precisely the form of the inner sides of the outer steel walls of the safe or cabinet, the essential being that the mold shall so form the casting that the latter shall fit perfectly within the steel walls of the safe or cabinet. The form of the casting will be the same as the form of the safe-walls, as will be readily understood upon reference to Figures 2, 3 and 4, and if a special interior formation of the casting is desired, it can be produced by properly forming the mold as shown in said figures, as well as in Figure 1. Thus a greater thickness of the casting, along the corners or portions 17, where the greatest amount of heat is apt to make its way, can be provided for to prevent heat conduction to the interior of the safe.

Figure 2:
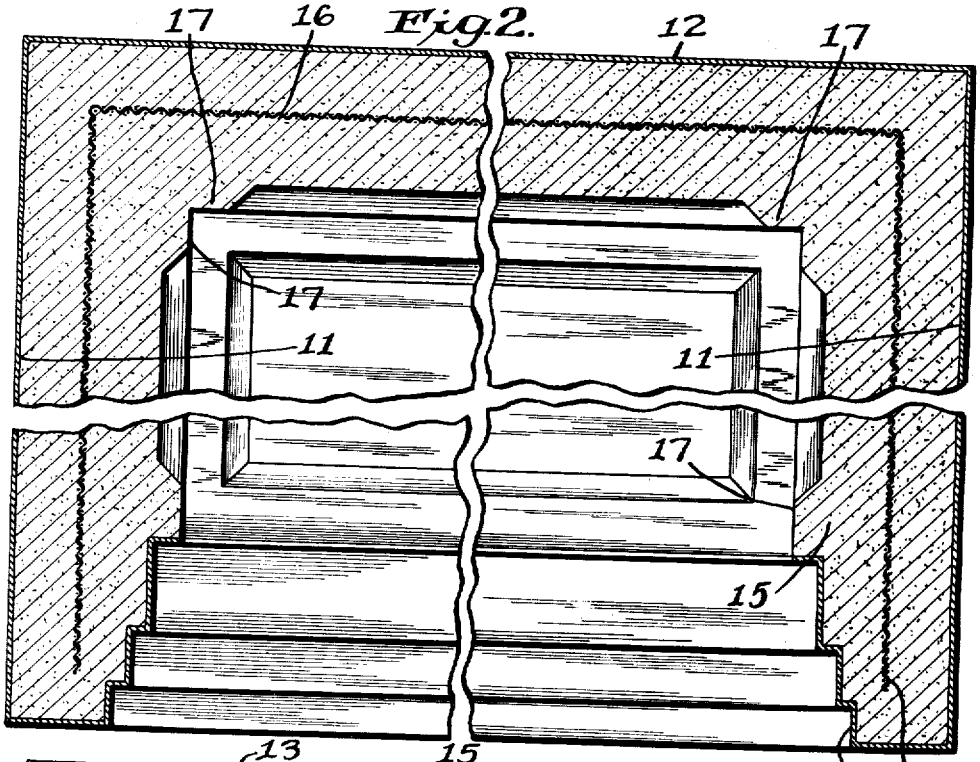
Fig. 2 is a horizontal sectional view of the cabinet without doors, the figure being broken centrally two ways owing to the limitations of the sheet.
Figure 3:
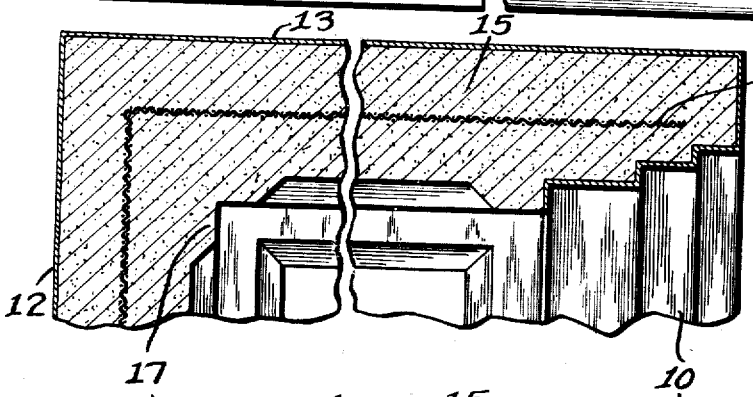
Fig. 3 is a fragmentary vertical sectional view of the upper part of the cabinet.
Figure 4:
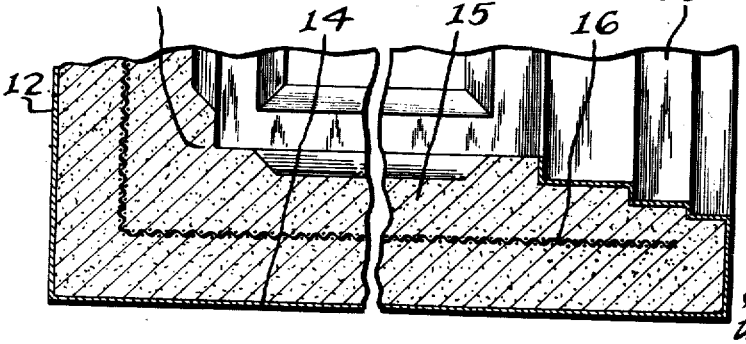
Fig. 4 is a fragmentary vertical sectional view of the lower part of the cabinet, Figures 3 and 4 being broken centrally to curtail the figure.

(3) If it is desired to reinforce the cast lining, a sheet of mesh wire is inserted or placed in the mold, as shown at 16, Figures 2, 3 and 4, before the mixture is poured. This gives the set composition a strength that will prevent it from breaking down under great heat, since it serves to hold the casting together at all times or as an integral unit.

(4) The mixture is poured into the mold and allowed to set, and the structure thus produced is removed from the mold. The structure contains superfluous or free water which, if allowed to remain, will give unnecessary weight, and might cause corrosion of the metal outside walls.

(5) Therefore, the casting is placed in a drying room where it is subjected to a fixed temperature and the effects of a blower apparatus. The free water is thus abstracted and the chemically bound moisture, only, is retained; and the casting is dried to the predetermined point. This completes the casting which is made entirely outside of, or independently of, the walls of the safe; and either at this time, or after being removed from the mold, the casting can be inspected, tested and defects remedied.

(6) The sheet metal casing, such as shown in Figures 2, 3 and 4, is now slipped on over the casting, the omitted wall of the casing is secured in place, by any suitable means or method, and the door, or doors, swung on the hinges. Inner walls, or linings, may be put in if desired; but the casting has a fine finish and can be painted, stained and grooved as desired.

From the foregoing description it is apparent that the prior art structures have many defects and are open to serious objections. Notably the safes have excessive weight due to the presence of free water, not bound or permanently fixed, in the mass of the filler or lining, such free water also subjecting the metal walls of the safe to liability of corrosion, and causing "sweating" which is detrimental to the contents of the safe. Furthermore, it is impossible to determine the percentage of free moisture in the plastic mass without breaking down the walls of the safe; and as the free water remains in the plastic mass during a period of several years, during which shrinkage takes place, cracking of the mass results and ways are opened for the passage of heat to the interior of the safe in case of fire or the presence of high temperature, this also weakening the structure of the plastic mass and developing high heat conduction. We overcome all the defects and objections present in the prior art, in that we produce a composite structure cast from a plastic mass from which all the free water has been abstracted in a drying room in a fixed temperature, leaving only the chemically bound moisture. This materially reduces weight, avoids corrosion of the metal walls of the safe and eliminates "sweating." Moreover, we cast the plastic mass in a mold independently of the safe walls, thus enabling examinations to be made when the casting is out of the mold, permitting defects to be remedied, and tests to be made as to the condition of the casting. Thus the casting is produced, as an article of manufacture ready for use and sale and does not have to await the evaporation of the moisture during a long period of years, nor can it deteriorate in any way during usage or a period of years, since shrinkage and cracking cannot occur. The casting, therefore, has great structural strength and rigidity, cannot develop high heat conduction, and is completed before it is placed in a safe as a lining therefor. The safe and its lining, moreover, are not affected by temperature and moisture and the contents thereof will not become mildewed. Furthermore, according to our invention, the casting during the process of making the same can be additionally reinforced by the introduction of wire mesh, which prevents disintegration when subjected to a very high temperature.

We claim:

1. A fire-heat resisting document-preserving cabinet or safe comprising an inner independent integral body including fixed walls composed of a set composition containing chemically bound water or moisture, and an outer shell of sheet-metal inclosing said integral body and independent thereof, said body being practically devoid, through artificial elimination, of free water and adapted under high temperature as in case of fire to release said chamically bound water in the form of vapor, said outer shell being operative in such case to prevent the exterior escape of said released vapor and said structure being adapted to permit the escape to the interior from said walls of such released vapor into contact with the contents of the cabinet.

2. A fire-heat resisting document-preserving cabinet or safe comprising an outer shell of sheet metal, an inner integral body structurally independent of said outer shell and including fixed side, top, bottom and back walls, said body being composed of a set composition containing chemically bound water or moisture and being practically devoid, through artificial elimination, of free water and adapted under high temperature as in case of fire to release said chemically bound water in the form of vapor, said outer shell being operative in such case to prevent the exterior escape of said released vapor and said structure being adapted to permit the escape to the interior from said walls of such released vapor into contact with the contents of the cabinet.

3. A composite structure, suitable for use as a safe or a safe lining, formed in one piece from suitable materials mixed with water, said structure when cast and set having the free water removed therefrom leaving only the chemically bound water therein.

4. A composite structure, suitable for use as a safe or a safe lining, formed in one piece from suitable materials mixed with water, said structure when cast and set having the free water removed therefrom leaving only the chemically bound water therein, which is susceptible of dissipation only by a degree of heat to which it would be subjected under the conditions of conflagration.

5. A composite structure, suitable for use as a safe or a safe lining, cast from suitable materials mixed with water as described, wherein the free water contained therein has been artificially expelled therefrom, leaving only the chemically bound water therein.

6. As an article of manufacture, a composite structure, suitable for use as a safe or a lining for safes or cabinets, consisting of a plastic material molded to form a hollow, jointless, composite block devoid of free moisture.

7. As an article of manufacture, a composite structure, suitable for use as a safe or a safe lining, cast in one piece from suitable plastic material normally carrying an excess of water, said structure when ready for use being devoid of free moisture and having only chemically bound moisture therein.

8. As an article of manufacture, a composite structure, suitable for use as a safe or a safe lining, composed of a one-piece, hollow casting, devoid of all moisture but that which is chemically bound therein.

9. A composite structure, suitable for use as a safe or a safe lining, cast from a solution of gypsum, sawdust and water as described, wherein the free water contained therein has been artificially expelled therefrom, and leaving only the chemically bound water therein.

10. A composite structure, suitable for use as a safe or a safe lining, cast from a solution of gypsum, sawdust and water as described, wherein the free water contained therein has been artificially expelled therefrom by the application of a predetermined degree of heat.

11. As an article of manufacture, a composite structure, suitable for use as a safe or a lining for safes or cabinets, consisting of a jointless, hollow, composite, block of material cast or molded to the desired form and devoid of free moisture, and having embodied therein metallic reinforcing material.

12. As an article of manufacture, a composite structure, suitable for use as a safe or a lining for safes or cabinets, consisting of a jointless, hollow, composite block of material cast or molded to the desired form and devoid of free moisture.

13. A heat resisting cabinet or safe consisting of two parts, one being an outer metallic shell or casing and the other being an inner, hollow, cast, jointless body, devoid of free moisture, the said inner body being formed independently of said casing and composed of a plastic, composite substance.

14. A heat resisting cabinet or safe consisting of two parts, one being an outer metallic shell or casing, and the other being an inner, hollow, cast, jointless body devoid of free moisture, the said inner body being formed independently of the casing and composed of a plastic, composite substance having chemically bound water, whereby the vapor released in the presence of high temperature is prevented from escaping externally by the said casing and is caused to enter the chamber of the casing.

15. A heat resisting cabinet or safe consisting of two parts, one being an outer metallic shell or casing rectangular in form, and the other being an inner, hollow, cast, jointless body devoid of free moisture, the said inner body being formed independently of the casing and composed of a plastic, composite substance having its corners or angles formed of increased thickness, whereby the better to resist the heat at such points.

16. A heat resisting cabinet or safe consisting of two parts, one being an outer metallic shell or casing and the other being an inner, hollow, cast, jointless body devoid of free moisture, the said inner body being formed independently of said casing, and composed of a plastic, composite substance having a reinforcement incorporated therein adapted to hold the casting together as an integral unit.

17. A heat resisting cabinet or safe consisting of two parts, one being an outer metallic shell or casing and the other being an inner, hollow, cast, jointless body devoid of free moisture, the said inner body being formed independently of said casing, and composed of a plastic, composite substance having wire mesh incorporated therein adapted to reinforce the same.

18. The method of making fire resisting safes or linings for safes which consists of the following steps or stages: the preparation of a mixture of suitable material with water substantially as described, and pouring the same into a suitable mold, allowing the cast to set in the mold and subjecting the cast to a drying process to an extent sufficient to eliminate from the cast the free water contained therein, and yet not sufficient to release the moisture which is chemically bound with the material of which the cast is formed.

19. The method of making fire resisting safes or linings for safes which consists of the following steps or stages: the preparation of a mixture of suitable material with water substantially as described, and pouring the same into a suitable mold, allowing the cast to set in the mold, introducing the cast into a drying room of fixed temperature and subjecting it to the action of a blower apparatus for the purpose of eliminating the free water contained therein, but limiting said drying process so that the water chemically bound in the material of the cast will not be eliminated.

20. The method of making fire resisting safes or linings for safes which consists of the following steps or stages: the preparation of a mixture of gypsum, sawdust and water, substantially as described, and pouring the same into a suitable mold and allowing the cast to set, then subjecting the cast to a drying process for the purpose of eliminating the free water therefrom, but not sufficient to eliminate the chemically bound moisture contained therein.

21. The method of making fire resisting safes or linings for safes which consists of the following steps or stages: the preparation of a mixture of gypsum, sawdust and water, substantially as described, and pouring the same into a suitable mold, allowing the cast to set in the mold, removing it from the mold, introducing the cast into a drying room of fixed temperature and subjecting it to the action of a blower apparatus for the purpose of eliminating the free water contained therein, but limiting said drying process so that the water chemically bound in the material of the cast will not be eliminated.

22. The method of making fire resisting safes or linings for safes which consists of the following steps or stages: the preparation of a mixture of suitable material with water substantially as described, the preparation of a suitable mold having mounted therein a network of reinforcing material, then pouring the fluid mixture into the mold so that the reinforcing material will be incorporated in the cast, and subjecting the cast to a drying process to an extent sufficient to eliminate from the cast the free water contained therein, and yet not sufficient to release the moisture which is chemically bound with the material of which the cast is formed.

23. The method of making fire resisting safes which consists of the following steps and stages: the preparation of a mixture of suitable material with water substantially as described and pouring the same into a suitable mold, allowing the cast to set in the mold and subjecting the cast to a drying process to an extent sufficient to eliminate from the cast the free water contained therein, and yet not sufficient to release the moisture which is chemically bound with the material of which the cast is formed, then introducing said cast into a suitable safe casing and sealing the casing.

Signed by us at Marietta, Ohio, this 6th day of January, 1922.

RALPH H. DICK.
CARL F. WOLTERS.

Witnesses:
H. E. WIGGINTON,
IVA B. DUTTON.

DISCLAIMER

Re. 15,529.—*Ralph H. Dick* and *Carl F. Wolters*, Marietta, Ohio. HEAT-RESISTING CABINET AND METHOD OF MAKING THE SAME. Patent dated January 16, 1923. Disclaimer filed March 4, 1936, by the assignee, *Remington Rand Inc.*

Hereby enters this disclaimer to claims 3, 4, 5, 6, 7, 8, 11, 12, 13, 16, 17, 18, 19, and 22 of said specification.

[*Official Gazette March 31, 1936.*]